(No Model.)

J. C. DELL.
RUNNER FOR GRINDING MILLS.

No. 404,607. Patented June 4, 1889.

Witnesses
Theo. Rollé
James F. Kelly

Inventor
John C. Dell
By his Attorneys
Diederheim & Kintner

UNITED STATES PATENT OFFICE.

JOHN C. DELL, OF PHILADELPHIA, PENNSYLVANIA.

RUNNER FOR GRINDING-MILLS.

SPECIFICATION forming part of Letters Patent No. 404,607, dated June 4, 1889.

Application filed January 25, 1889. Serial No. 297,497. (No model.)

*To all whom it may concern:*

Be it known that I, JOHN C. DELL, a citizen of the United States, residing in the city and county of Philadelphia, State of Pennsylvania, have invented a new and useful Improvement in Runners for Grinding-Mills, which improvement is fully set forth in the following specification and accompanying drawings.

My invention relates to improvements in grinding-mills, more particularly those in which the runners are connected with the shafts in such manner that should obstacles enter between the said runner and the bed thereof the runner may be said to slip on its shaft, thus preventing injury to the mill.

The invention consists of novel means for connecting the runner with the shaft, whereby the above-mentioned purposes are accomplished.

It also consists of novel means of forming the runner, as will be hereinafter fully set forth.

Figure 1:
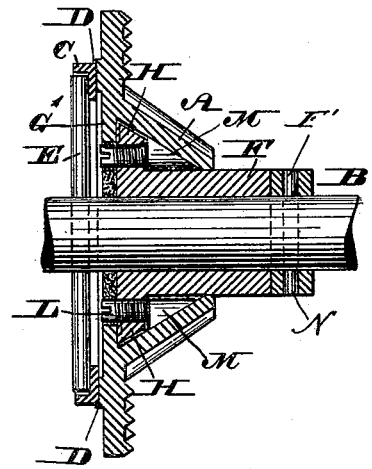
Figure 2:
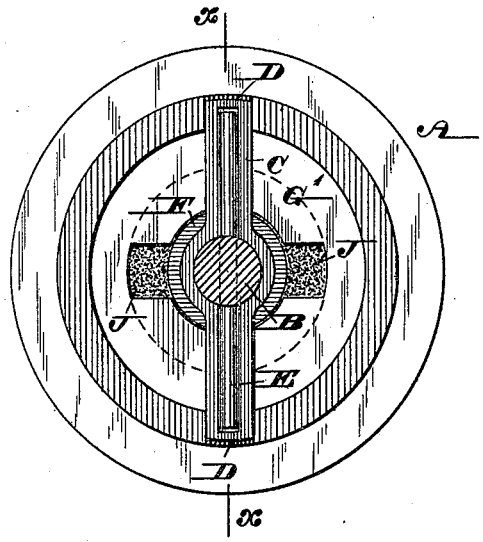
Figure 3:
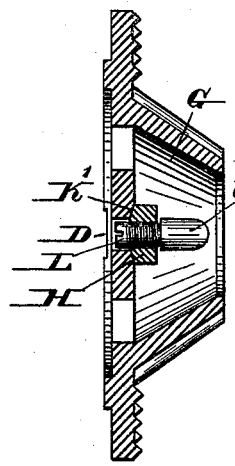
Figure 4:
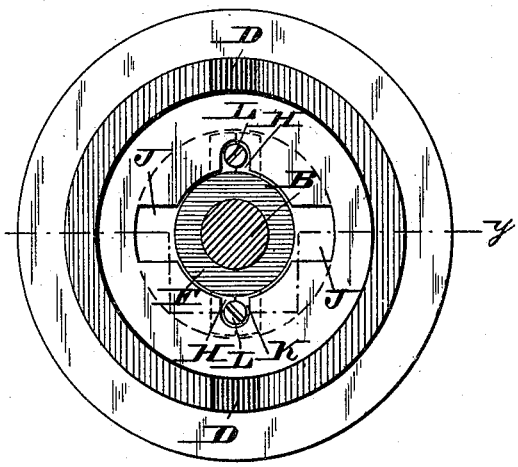
Figure 5:
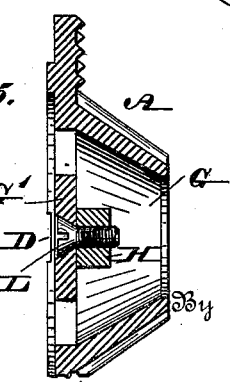

Figure 1 represents a section on line $x\,x$, Fig. 2, of a runner for a grinding-mill embodying my invention. Fig. 2 represents an end view thereof. Fig. 3 represents an irregular section on line $y\,y$, Fig. 4. Fig. 4 represents an end view, certain parts being removed. Fig. 5 represents a section of a modification.

Similar letters of reference indicate corresponding parts in the several figures.

Referring to the drawings, A designates the runner of a grinding-mill, the same being freely fitted on the shaft B and connected with the same by means of a key or guard C, which encircles said shaft and has its ends seated in recesses D on the back of the runner or the widest part thereof. A rod, bar, or pin E, of spring or elastic metal or material, is passed through the driving-shaft B, and occupies a position in a recess in said key or guard C.

The hub F, which receives the shaft B, is made separate from the bed of the runner and connected with the same, as follows: The bed has a chamber G around the central opening, through which the hub is passed, and the portion of the hub within the bed has near its end ears H, which are adapted to occupy said chamber G. The wall G', which may be said to constitute the base of the runner, which, as will be seen, is of conical form, has in it the throats J and openings K, said openings K being at a right angle to the throats J; but to said angle I do not limit myself.

It will be seen that when the hub is fitted into the bed of the runner the ears H pass through the throats J to the rear thereof. The hub is now rotated, whereby the openings in said ears coincide with the openings K of the wall of the runner, it being seen that said ears drop into recesses K' behind said wall, thus locking the hub and body. Screws L are now inserted through the openings K into the ears and properly rotated, whereby the hub and body of the runner are firmly connected, and when in use may be rotated as one.

The unoccupied portion of the chamber G may be filled with cement or other suitable material, the same being introduced through the throats J and closing said throats, as will be seen in Figs. 1 and 2. To prevent lateral motion of the hub F in the opposite direction from the bar E, the sleeve F' is secured on the shaft B by means of the pin N, which passes through the said sleeve and shaft, the said sleeve abutting against the end of the hub F. The runner as thus constructed rotates with the shaft B, owing to the key or guard C and rod or bar E, and the grinding of the material may be accomplished as usual in such cases. Should, however, obstacles—such as nails, stones, &c.—enter between the runner and its bed, thus clogging the same and holding the runner, the key C, owing to the yielding ends of the spring-bar E, is forced from its seat on the runner, and the shaft continues its rotation, while the runner remains at rest. When the obstacles are removed, the key returns to its seat, thus again connecting the runner with the shaft and causing its rotation with the same.

Within the chamber G are lugs M, on which the points of the screws L bear, as in Figs. 1, 2, 3, and 4, said screws being of the order of studs, by which means the ears H may be tightened against the wall of the chamber G. In Fig. 5 the screws have conical heads and bear against the walls of the openings K, said walls being countersunk, whereby the ears H may be tightened against the wall G' and thus firmly held.

In practice the hub is made of softer metal than the body, the latter being of very hard metal, so that said hub may be readily bored and finished in order to center the runner true on the shaft.

Having thus described my invention, what I claim as new, and desire to secure by Letters Patent, is—

1. A runner having a wall formed with a throat, and a hub having an ear which is adapted to enter the runner through said throat, said ear being connected with the back of said wall within the runner and screwed or secured thereto, substantially as described.

2. A runner formed of a hollow body and a separate hub, said body having a wall provided with a throat and an opening, and said hub having an ear which is secured to said wall by a screw which passes through said opening and enters said ear, substantially as described.

3. A runner with wall having a throat and an opening leading into a chamber in said runner, a hub with an ear in said chamber, a lug on the inner wall of said chamber, and a fastening-screw passing through said ear and bearing against said lug, said parts being combined substantially as and for the purpose set forth.

4. A runner with wall having a throat and opening leading into an inner chamber, a hub with ear in said chamber, a shaft on which the hub is mounted, and a key encircling the shaft and having its ends in the recesses in the walls of the runner, said parts being combined substantially as described.

5. A runner with wall having a throat and an opening leading into a chamber in said runner, a hub with an ear, a shaft on which the hub is mounted, a key encircling the shaft and having its ends in recesses in the runner, and a spring-bar passing through an opening in the shaft and seated in a recess in the key, said parts being combined substantially as and for the purpose set forth.

JOHN C. DELL.

Witnesses:
JOHN A. WIEDERSHEIM,
L. JENNINGS.